US006073487A

United States Patent [19]
Dawson

[11] Patent Number: 6,073,487
[45] Date of Patent: Jun. 13, 2000

[54] EVAPORATIVE SYSTEM LEAK DETECTION FOR AN EVAPORATIVE EMISSION CONTROL SYSTEM

[75] Inventor: Gary D. Dawson, Rochester, Mich.

[73] Assignee: Chrysler Corporation, Auburn Hills, Mich.

[21] Appl. No.: 09/131,870

[22] Filed: Aug. 10, 1998

[51] Int. Cl.[7] .............................. G01D 18/00; G01C 17/38

[52] U.S. Cl. .............................. 73/118.1; 73/116; 73/49.7

[58] Field of Search .............................. 73/118.1, 116, 73/49.7

[56] References Cited

U.S. PATENT DOCUMENTS

| | | |
|---|---|---|
| 5,275,144 | 1/1994 | Gross . |
| 5,495,749 | 3/1996 | Dawson et al. . |
| 5,606,121 | 2/1997 | Blomquist et al. . |
| 5,616,836 | 4/1997 | Blomquist et al. . |
| 5,635,630 | 6/1997 | Dawson et al. . |
| 5,641,899 | 6/1997 | Blomquist et al. . |
| 5,651,350 | 7/1997 | Blomquist et al. . |
| 5,685,279 | 11/1997 | Blomquist et al. . |
| 5,715,799 | 2/1998 | Blomquist et al. . |

*Primary Examiner*—Max Noori
*Assistant Examiner*—Octavia Davis
*Attorney, Agent, or Firm*—Mark P. Calcaterra

[57] ABSTRACT

A method of leak detection for an evaporative emission control system is provided which determines if a potential leak is present in a portion of the system. The method includes the steps of monitoring an engine shut-off event and subsequently sealing the evaporative emission control system atmospheric vent such that the evaporative emission control system's internal pressure is isolated from external influences, absent a leak. After sealing the system, the internal pressure of the system is monitored for changes which should occur upon the cooling of the evaporative emission control system components. That is, when the components cool, the pressure within the sealed system should decrease. If the internal pressure of the evaporative emissions control system reduces so as to create a vacuum, the methodology assesses that no leaks in the system are present. However, if the internal pressure within the evaporative emission control system does not create a vacuum upon cooling of the components, the methodology assesses that a potential leak exists in the system.

14 Claims, 1 Drawing Sheet

EVAPORATIVE SYSTEM LEAK DETECTION FOR AN EVAPORATIVE EMISSION CONTROL SYSTEM

BACKGROUND OF THE INVENTION

1. Technical Field

The present invention relates generally to an evaporative emission control system for an automotive vehicle and, more particularly, to a leak detection assembly and method for determining if a leak is present in a portion of an evaporative emission control system for an automotive vehicle.

2. Discussion

Modern, gasoline powered automotive vehicles typically include a fuel tank and an evaporative emission control system that collects fuel vapors generated in the fuel tank. The evaporative emission control system includes a vapor collection canister, usually containing an activated carbon, to collect and store fuel vapors. Normally, the canister collects fuel vapors which accumulate during refueling of the automotive vehicle or from increases in fuel temperature. The evaporative emission control system also includes a purge valve placed between an intake manifold of an engine for the automotive vehicle and the canister. The purge valve is opened by an engine control unit an amount determined by the engine control unit to purge the canister, i.e., the collected fuel vapors are drawn into the intake manifold from the canister for ultimate combustion within the engine.

Recently, governmental regulations have required that certain gasoline powered automotive vehicles have their evaporative emission control systems checked to determine if a leak exists in the system. As a result, on board vehicle diagnostic systems have been developed to determine if a leak is present in a portion of the evaporative emission control system. One such diagnostic method utilizes a vent valve to seal the canister vent, a sensor to monitor system pressure, and a purge valve to draw a vacuum on the evaporative emission control system. The method then monitors whether a loss of vacuum occurs within a specified period of time.

Diagnostic systems also exist for determining the presence of a leak in an evaporative emission control system which utilize positive pressurization rather than negative pressurization, i.e. a vacuum. In positive pressurization systems, the evaporative emission control system is pressurized to a set pressure, typically through the use of an air pump. A sensor determines whether a loss of pressure occurs over a certain amount of time. There are also pressurization systems which use various methods of sensing flow to determine if a leak is present.

While positive and negative pressurization systems have achieved success, there is room for improvement in the art. For instance, it would be desirable to provide a leak detection system which does not require either positive or negative pressurization from an outside source. Additionally, a leak detection system which functions when the vehicle is not operating avoids many of the complicating issues which makes leak detection on an operating vehicle a very difficult undertaking.

SUMMARY OF THE INVENTION

It is therefore, one object of the present invention to provide a leak detection assembly for use in testing the integrity of an evaporative emission control system for an automotive vehicle.

It is another object of the present invention to provide a leak detection method having means for sealing the evaporative emission control system such that an internal pressure thereof is isolated from external influences.

It is yet another object of the present invention to provide a leak detection method having a means for monitoring the internal pressure of the evaporative emission control system after it has been sealed such that a leak may be detected by noting if the pressure within the sealed evaporative emission control system goes below atmospheric pressure as the evaporative emission control system components cool.

The above and other objects are provided by a method of leak detection for an evaporative emission control system which determines if a potential leak is present in a portion of the system. The method includes the steps of monitoring an engine shut-off event and subsequently sealing the evaporative emission control system atmospheric vent such that the evaporative emission control system's internal pressure is isolated from external influences, absent a leak. After sealing the system, the internal pressure of the system is monitored for changes which should occur upon the cooling of the evaporative emission control system components. That is, when the components cool, the pressure within the sealed system should go below atmospheric pressure. If the internal pressure of the evaporative emissions control system reduces so as to create a vacuum, the methodology determines that no leaks in the system are present. However, if the internal pressure within the evaporative emission control system does not reduce so as to create a vacuum upon cooling of the components, the methodology determines that a potential leak exists in the system.

One advantage of the present invention is that a simple and low cost method is provided for detecting a leak in an evaporative emission control system of an automotive vehicle.

As a further feature of the present invention, the vent valve is designed so as to allow fuel vapors to readily flow from the vapor control system to the canister. This ensures that flow occurs at low pressure levels and is especially important on vehicles equipped with Onboard Refueling Vapor Recovery (ORVR) systems in that excessive pressure in the vapor flow path could result in difficulty refueling the vehicle.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The present invention is directed towards a method of leak detection for an evaporative emission control system to determine if a leak is present in a portion of the system. The method is based on the principle that upon cooling of evaporative emission control system components, the internal pressure of the sealed evaporative emission control system should go negative (less than atmospheric). However, if a sufficient leak is present in a portion of the system, the internal pressure will not go negative. By monitoring the sealed system for changes in internal pressure while cooling, a potential leak can be identified. For the purposes of this description, it should be appreciated that the phrase "no leak" encompasses a spectrum of conditions ranging from a completely sealed condition to a slightly leaking condition wherein the vacuum in the evaporative control system upon cool down is just able to achieve a predetermined threshold value.

Figure 1:
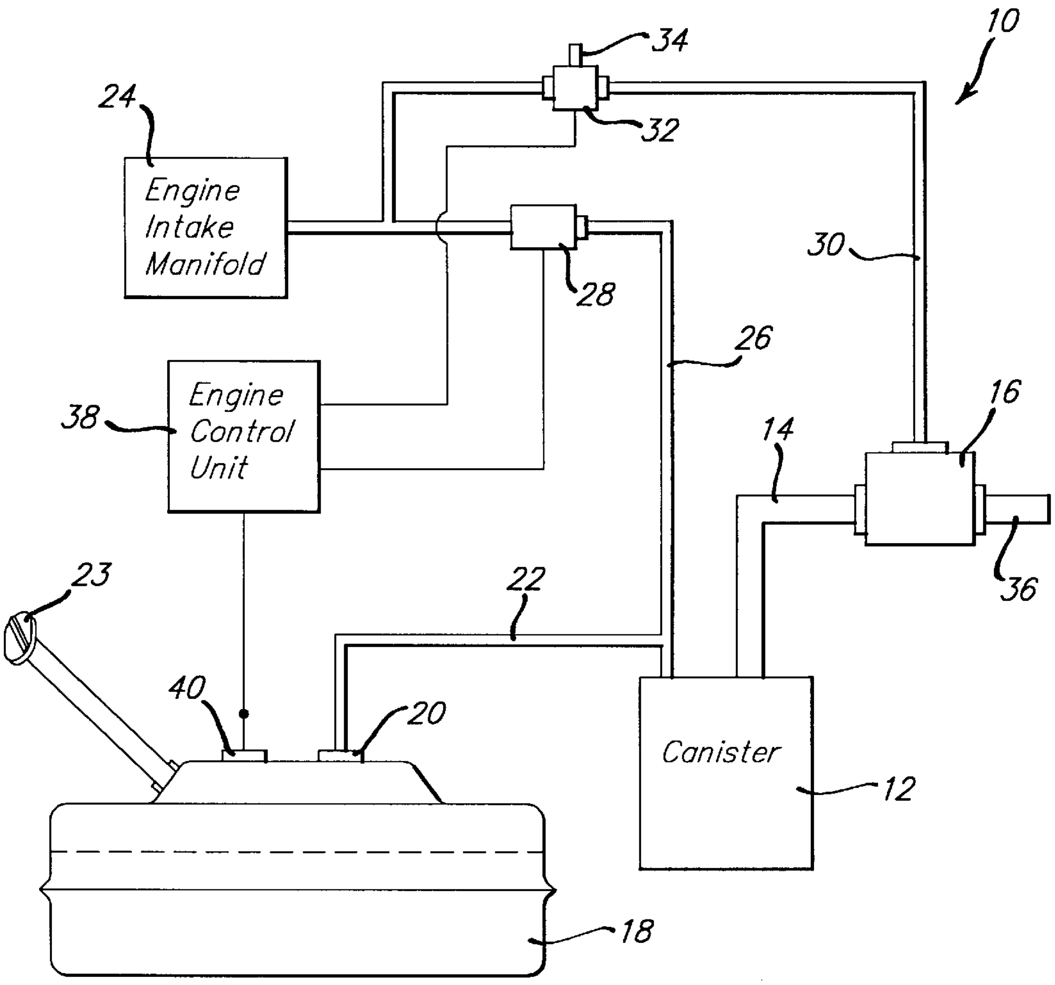
FIG. 1 is a schematic diagram of an evaporative emission control system according to the present invention.

Turning now to the drawing figures, FIG. 1 illustrates an evaporative emission control system 10 for an automotive vehicle (not shown) according to the present invention. The control system 10 includes a carbon canister 12 connected by a conduit 14 to a vent valve 16. A fuel tank 18 is connected to the carbon canister 12 by a tank rollover and vapor flow control valve 20 and a conduit 22. This is a representative example of several possible means by which the fuel tank 18 may be connected to the carbon canister 12.

An intake manifold 24 is connected to the carbon canister 12 by a conduit 26. The control system 10 also includes a purge valve 28 mounted along the conduit 26. The intake manifold 24 is connected to the vent valve 16 through conduit 30. An optional three-way solenoid 32 is mounted along the conduit 30. A conduit 34 connected to the solenoid 32 leads to the atmosphere. Likewise, a conduit 36 connected to the vent valve 16 leads to the atmosphere. The vent control valve 16 seals or closes the conduit 14 between the carbon canister 12 and the atmospheric vent 36 in order to fix the internal pressure of the evaporative emission control system 10.

The control system 10 also includes an engine control unit 38 connected to and operative to control the solenoid 32 and purge valve 28. The ECU 38 is also connected to and operative to monitor a vacuum switch 40 connected to the fuel tank 18. The optional three-way solenoid valve 32 enables more positive determinations of the functioning of the switch 40 and the purge valve 28.

In operation, a supply of liquid fuel for powering an engine (not shown) of the automotive vehicle is placed in the fuel tank 18. As fuel is pumped into the fuel tank 18 or as the temperature of the fuel increases, vapors from the fuel pass through the conduit 22 and are received in the canister 12. As described in greater detail below, the vent valve 16 is designed so as to allow fuel vapors to readily flow from the remainder of the control system 10 to the canister 12. This ensures that flow occurs at low pressure levels and is especially important on vehicles equipped with ORVR systems in that excessive pressure in the vapor flow path could result in difficulty refueling the vehicle. The purge valve 28 is normally closed. Under certain vehicle operating conditions conducive to purging, the engine control unit 38 operates the purge valve 28 such that a certain amount of engine intake vacuum is delivered to the canister 12 causing the collected vapors to flow from the canister 12 through the conduit 26 and the purge valve 28 to the intake manifold 24 for combustion in the engine.

Figure 2:
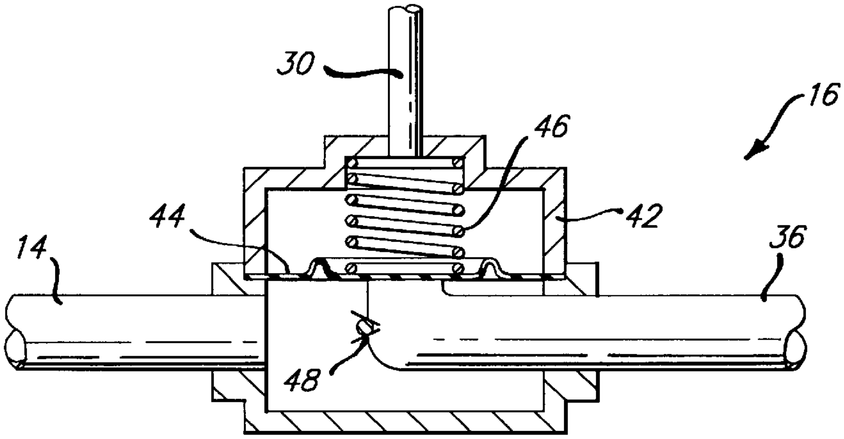
FIG. 2 is a cross-sectional view of the vent valve of the evaporative emission control system of FIG. 1.

Turning now to FIG. 2, a cross-sectional view of the vent valve 16 of FIG. 1 is shown. The vent valve 16 includes a body 42 interengaging the conduit 30 with the conduit 14 and the vent line 36. A diaphragm 44 is disposed within the body 42 so as to bifurcate the vent valve 16 into a first half in fluid communication with the conduit 30 and a second half in fluid communication with the conduit 14 and vent line 36. The diaphragm 44 is also disposed so as to sealingly engage an end of the vent line 36. A spring 46 may be employed within the body 42 to bias the diaphragm 44 against the end of the vent line 36. A check valve 48 is mounted within the vent line 36 so that if a large vacuum is created within the control system 10 the check valve 48 will open prior to the vacuum relief valve in the fuel cap 23 (see FIG. 1).

As can be appreciated, the diaphragm 44 normally seals off the conduit 14 from the vent line 36 so that the pressure within the control system 10 is isolated from external influences. However, if desired, negative pressure from the engine intake manifold 24 (FIG. 1) may cause a pressure differential between the two halves of the vent valve 16 which overcomes the bias of spring 46 and lifts the diaphragm 44 from the end of the vent line 36. Thereafter, the conduit 14 and canister 12 are in fluid communication with the atmosphere through vent line 36.

In an engine off condition, an increase in the vapor control system pressure, as a result of system heating, will be transmitted via conduit 14 so as to act upon diaphragm 44 causing it to overcome the force of spring 46, thereby, opening a path to conduit 36 and, thus to atmosphere. Likewise, the rise in system pressure caused by the flow of fuel into the fuel tank 18 during vehicle refueling will also allow flow to atmosphere in the same manner. As explained previously, it should be appreciated that fuel vapors flowing from the fuel tank 18 during these events will be captured by the canister 12, thus permitting only air to flow to the atmosphere.

Although a mechanical valve 16 has been described in the above embodiment, it should be appreciated that an electrically operated solenoid valve could substitute therefore. In this case, the solenoid valve would be in operative relation with the engine control unit which would control the opening and closing thereof.

Upon operating the automotive vehicle wherein the control system 10 is installed, the components of the control system 10 will heat up. When the automotive vehicle is parked and the engine is turned off, the control system 10 cools down. Although the range of temperature cool down varies, a five to ten degree cooling range is typical. Note that absent the heating and cool down associated with operating the vehicle, normal diurnal ambient temperature cycling will provide sufficient temperature range for the method to function should the vehicle remain parked for an extended period. Since the vent valve 16 is normally closed, the pressure within the control system 10, absent a leak, is sealed from the atmosphere. Upon cooling of the control system 10, the internal pressure thereof should go negative thereby creating a vacuum. When the vacuum in the control system 10 exceeds a predetermined threshold, the vacuum switch 40 closes. The engine control unit 38 monitors the signal from the switch 40 and, if the switch closes, makes an assessment that no leak in the control system 10 is present. On the other hand, if a sufficient leak exists in the control system 10, the pressure thereof will not go negative upon cooling. As such, the vacuum switch 40 will remain open and the ECU will make an assessment that a potential leak is present. While the preferred embodiment of the invention utilizes a normally open switch, a normally closed switch, which opens at the predetermined pressure level, could also be used.

It should be appreciated that although a vacuum switch 40 is illustrated in this embodiment, a sensor or transducer constantly monitoring the pressure condition within the fuel tank 18 may substitute therefore. In either case, when the pressure within the fuel tank 18 drops below a predetermined threshold, a signal is sent to the engine control unit 38 indicating that no leak is present. It should also be appreciated that the switch or sensor may be positioned at various locations within the evaporative emission control system, as appropriate for commercial implementation of the method.

In accordance with the present invention, the vacuum switch is used to perform a test of the integrity of the evaporate emission control system. To conduct the test, the vent valve (and purge valve) are closed at engine key off. With the system sealed, a vacuum should be created within the evaporative system components upon cooling. If a vacuum is indeed created, the vacuum switch closes sending a signal to the engine control unit which assesses the signal as an indication that no leak in the system is present. However, if the vacuum switch remains open, the engine control unit assesses the lack of a signal therefrom as an indication that a potential leak exists in the system.

Thus, the present invention provides a method of leak detection which avoids the need for positive pressurization or negative pressurization of the control system by an external source. Rather, the present invention takes advantage of the pressure drop inherent in a closed system upon that system cooling. More particularly, if the pressure within the fuel tank drops below a predetermined threshold, the vacuum switch closes thereby indicating that no leak is present. However, if no vacuum is created, the vacuum switch remains open thereby indicating that a potential leak exists.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of diagnosing an evaporative emission control system to determine if a leak is present in the system, said method comprising the steps of:

sealing said system from external influences;

monitoring a pressure level within said system over a cooling period; and indicating a potential leak condition if said pressure level within said system does not fall below a given threshold over said cooling period.

2. The method of claim 1 wherein said sealing step further comprises closing a vent valve of said system which communicates with an atmospheric flow path of said system.

3. The method of claim 1 wherein said sealing step further comprises closing a vent solenoid of said system which communicates with an atmospheric flow path of said system.

4. The method of claim 1 wherein said monitoring step further comprises noting an open/closed mode of a vacuum switch of said system.

5. The method of claim 1 wherein said monitoring step further comprises noting a pressure level signal from a sensor of said system.

6. The method of claim 1 wherein said monitoring step further comprises noting a pressure level signal from a transducer of said system.

7. The method of claim 1 wherein said sealing step further comprises closing a purge valve of said system which communicates with an engine associated with said system.

8. An evaporative emission control system leak detection assembly comprising:

an engine;

a fuel tank associated with said engine;

a carbon canister connected to said fuel tank;

a vent valve selectively interconnecting said carbon canister with atmosphere;

a purge valve selectively interconnecting said carbon canister with said engine;

a pressure sensor operatively coupled to said fuel tank and operative for sensing pressure changes within said fuel tank; and an engine control unit operatively coupled to said pressure sensor for assessing a potential leak condition in said evaporative emission control system if said pressure sensor does not detect a change in pressure below a given value within said fuel tank upon cooling after said vent valve isolates said canister from atmosphere and said purge valve isolates said canister from said engine.

9. The assembly of claim 8 wherein said pressure sensor further comprises a vacuum switch.

10. The assembly of claim 8 wherein said pressure sensor further comprises a transducer.

11. The assembly of claim 8 wherein said vent valve further comprises:

a housing interconnecting a first conduit extending from said canister with a vent line of said assembly which communicates with atmosphere; and a diaphragm normally closing said vent line from communicating with said first conduit.

12. The assembly of claim 11 wherein said vent valve further comprises a second conduit coupled to said housing and communicating with an intake manifold of said engine such that a vacuum from said intake manifold lifts said diaphragm from said vent line thereby enabling communication between said vent line and said first conduit.

13. The assembly of claim 11 further comprising a check valve interdisposed between said first conduit and said vent line such that a vacuum within said canister greater than a predetermined threshold opens said check valve to establish communication between said first conduit and said vent line.

14. A method of diagnosing an evaporative emission control system to determine if a leak is present in said system, said method comprising the steps of:

closing a vent valve of said system such that said system is isolated from atmosphere;

closing a purge valve of said system such that said system is isolated from an intake manifold of an engine associated with said system;

monitoring a pressure within said system;

closing a switch of said system when said pressure within said system drops below a given threshold value;

detecting said closing of said switch and assessing said closing as an indication that no leak condition exists in said system; and detecting a nonclosing of said switch and assessing said nonclosing as an indication that a potential leak condition exists in said system.

* * * * *